Figure 5:
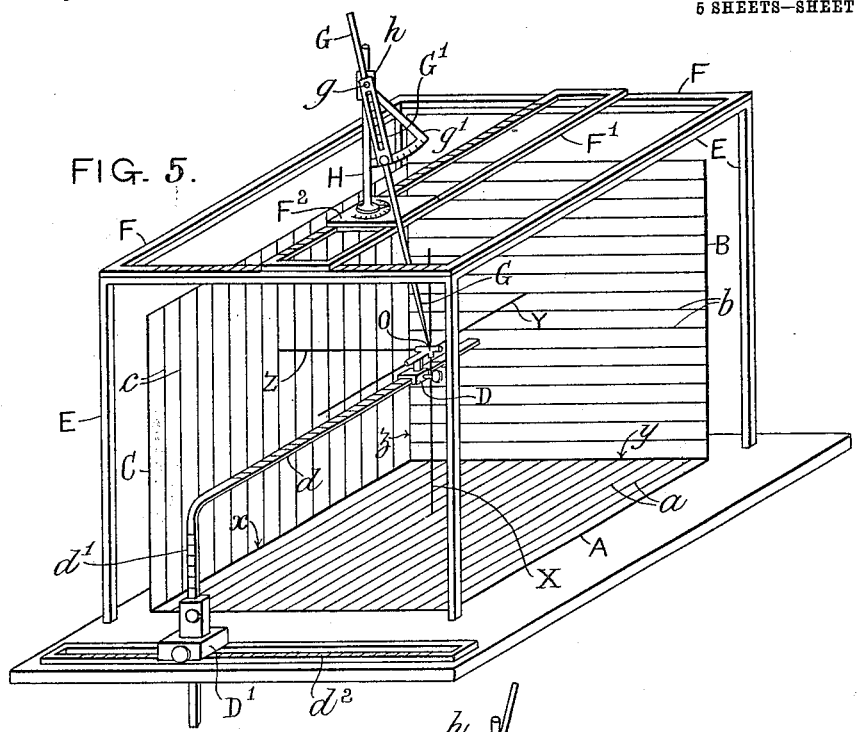

R. H. CLARKE.
APPARATUS FOR GAGING THE POSITION OF AND DIRECTING ACCESS TO POINTS WITHIN CLOSED SURFACES.
APPLICATION FILED JULY 17, 1913.
1,134,106.
Patented Apr. 6, 1915.
5 SHEETS—SHEET 1.
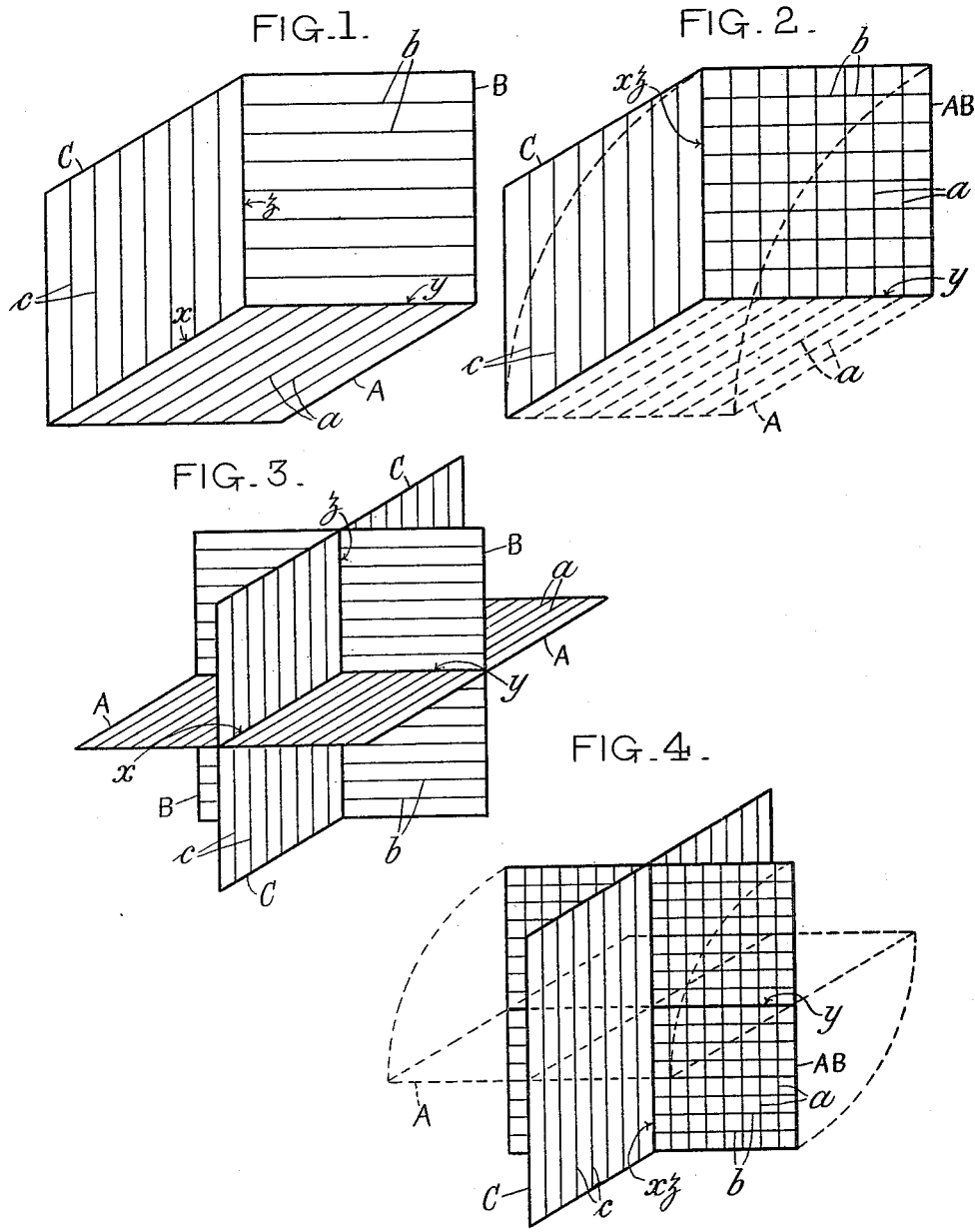

R. H. CLARKE.
APPARATUS FOR GAGING THE POSITION OF AND DIRECTING ACCESS TO POINTS WITHIN CLOSED SURFACES.
APPLICATION FILED JULY 17, 1913.

1,134,106.

Patented Apr. 6, 1915.
5 SHEETS—SHEET 2.

WITNESSES:
G. V. Rasmussen
George Du Bois

INVENTOR
Robert H. Clarke
BY
Briesen & Knauth
ATTORNEYS

R. H. CLARKE.
APPARATUS FOR GAGING THE POSITION OF AND DIRECTING ACCESS TO POINTS WITHIN CLOSED SURFACES.
APPLICATION FILED JULY 17, 1913.
1,134,106.
Patented Apr. 6, 1915.
5 SHEETS—SHEET 3.
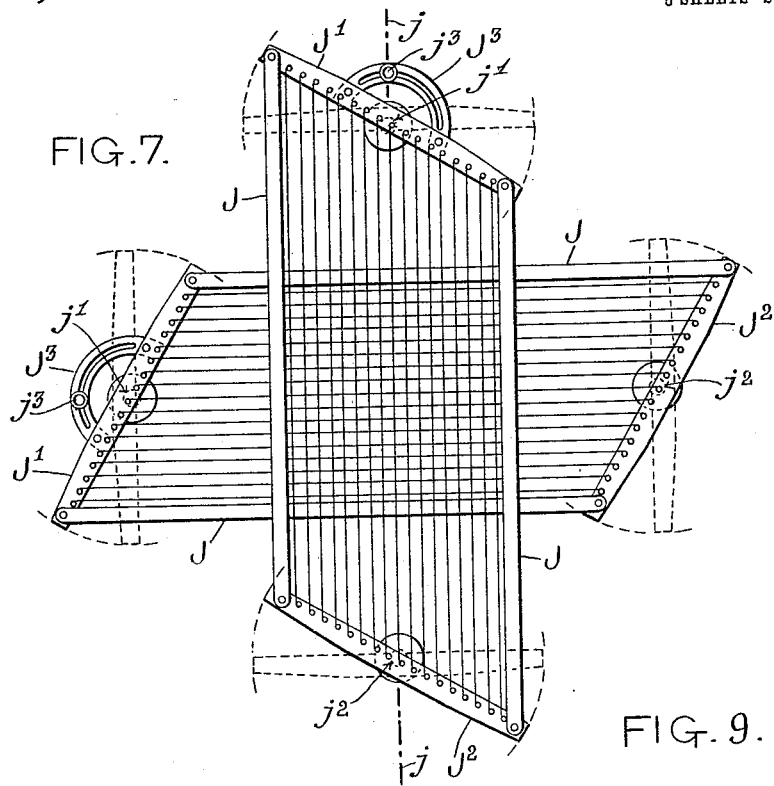
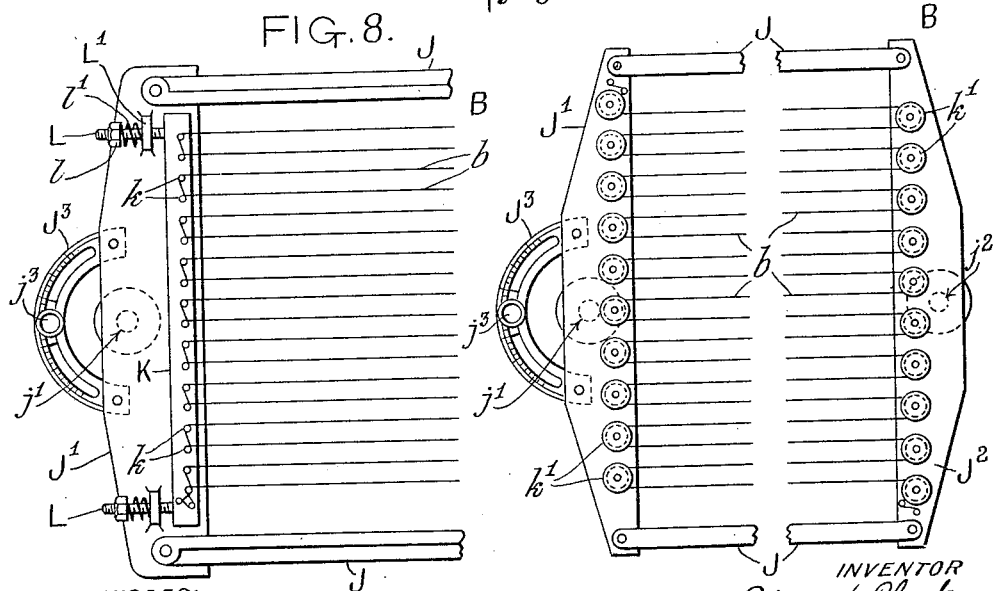

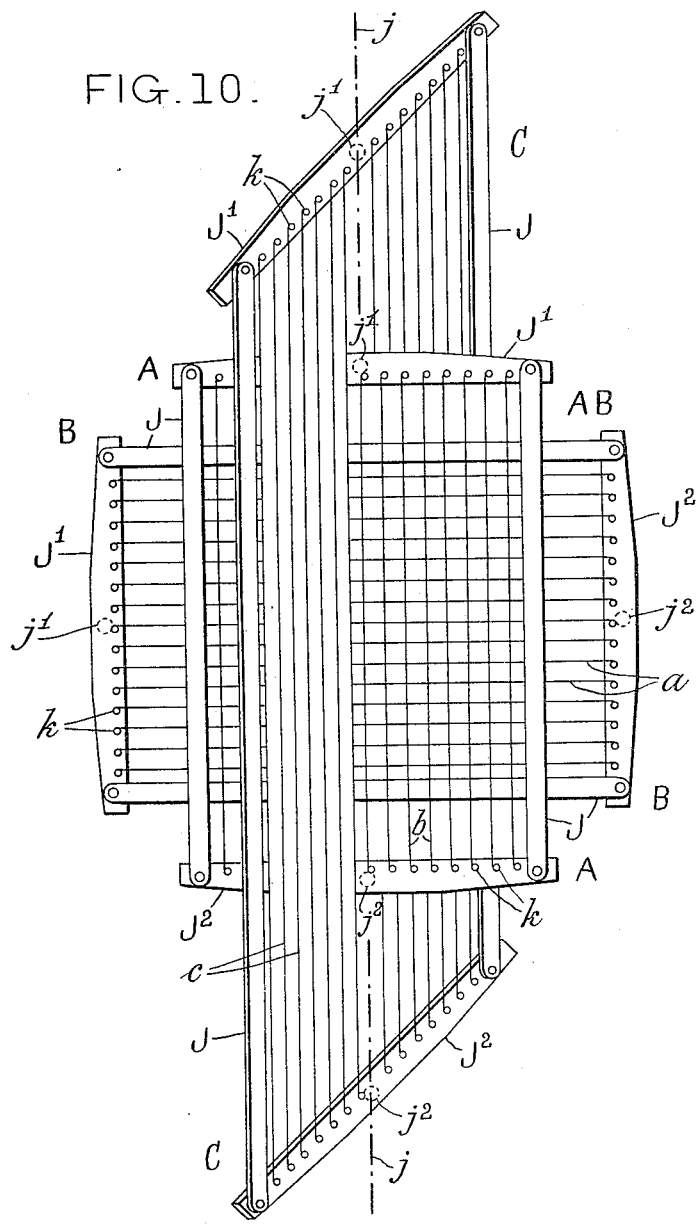

R. H. CLARKE.
APPARATUS FOR GAGING THE POSITION OF AND DIRECTING ACCESS TO POINTS WITHIN CLOSED SURFACES.
APPLICATION FILED JULY 17, 1913.

1,134,106.

Patented Apr. 6, 1915.
5 SHEETS—SHEET 5.

WITNESSES:
G. V. Rasmussen
George Du Bois

INVENTOR
Robert H. Clarke
BY
Briesen & Knauth
ATTORNEYS though the following is # UNITED STATES PATENT OFFICE.

ROBERT HENRY CLARKE, OF WARLINGHAM, ENGLAND.

APPARATUS FOR GAGING THE POSITION OF AND DIRECTING ACCESS TO POINTS WITHIN CLOSED SURFACES.

1,134,106.  Specification of Letters Patent.  Patented Apr. 6, 1915.

Application filed July 17, 1913. Serial No. 779,452.

*To all whom it may concern:*

Be it known that I, ROBERT HENRY CLARKE, a subject of the King of Great Britain, and resident of "Oakfield," Warlingham, in the county of Surrey, England, surgeon, have invented certain new and useful Apparatus for Gaging the Position of and Directing Access to Points Within Closed Surfaces, of which the following is a specification.

This invention has for its object to facilitate the operation of reaching with precision, by the shortest path, any predetermined point within an inclosed space whose interior may be invisible but the relative positions of whose contents are known with concurrent reference to three mutually-perpendicular assumed planes which intersect one another either within or outside the space in question.

The invention consists of what may be termed a stereotaxic indicator for gaging the position of and directing access to the point in question, by exhibiting a mechanical representation of the position of such predetermined point within the inclosed space (hereinafter termed the "solid") and of the means of directing access thereto by another, or so-called operative instrument, so that this latter, with the aid of the indications thus afforded, shall be enabled to reach the predetermined point within the solid itself.

The stereotaxic indicator fulfils two functions, the first of which is to furnish, by means of what may be termed an adjustable "index-point," a mechanical representation of the position (and therefore of the ordinates determining the position) of the predetermined point with reference to three fixed planes (hereinafter termed "indicator-planes"), respectively corresponding, in the indicator, to the three mutually-perpendicular assumed planes (hereinafter termed the "zero-planes") of the solid. The second function of the stereotaxic indicator is to enable a pointed and longitudinally slidable straight rod, forming part of the indicator and hereinafter referred to as the "finder," to be so adjusted, in a plane making any desired angles with the respective indicator-planes, that the extremity of the finder shall coincide with the index-point. The object of effecting the coincidence just mentioned is to furnish the necessary data for enabling a member of the so-called operative instrument, corresponding to the finder of the indicator (and hereinafter for convenience termed the "probe"), to be so projected into the solid itself, by a single movement of the probe lengthwise of its own axis and in a direction relatively to the zero-planes of the solid answering to that denoted by the position of the finder-axis relatively to the indicator-planes of the indicator, as to insure that the extremity of the probe, although invisible, shall by said single movement be brought into coincidence with the predetermined point in the solid.

Figure 6:
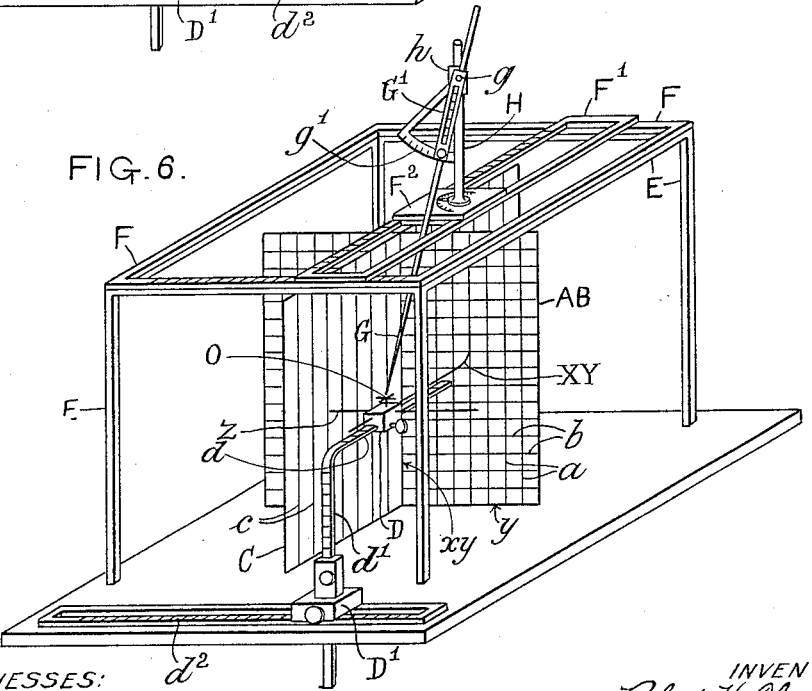
Figure 12:
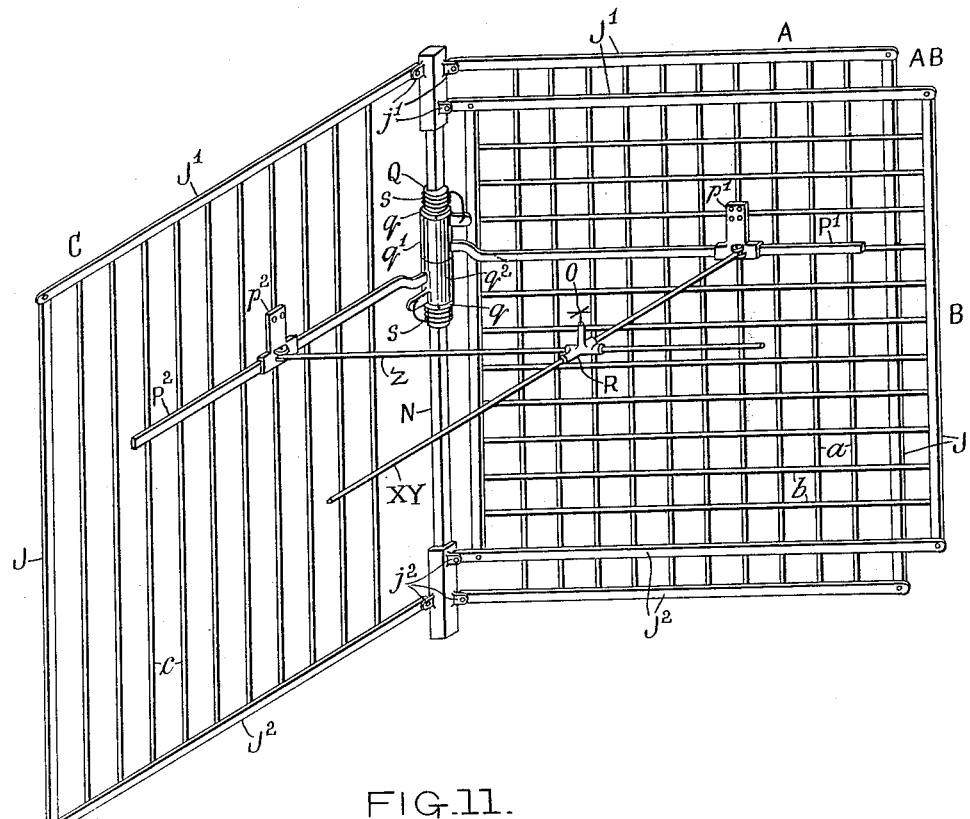
Figure 11:
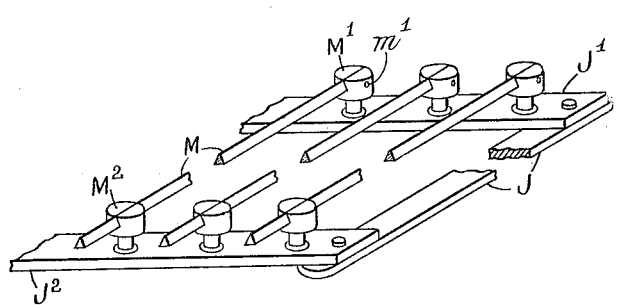

In the accompanying drawings, Figures 1 to 4 inclusive are diagrammatic perspective views illustrating respectively four different arrangements of the so-called screens which constitute a portion of the stereotaxic indicator; Fig. 1 showing a combination of three so-called gridiron-screens, Fig. 2 a combination of one gridiron-screen with one reticulated screen, Fig. 3 another combination of three gridiron-screens, and Fig. 4 another combination of one gridiron-screen with one reticulated screen. Fig. 5 is a perspective elementary view illustrating one form of the complete indicator comprising an arrangement of screens such as that shown in Fig. 1; the index-needles being supported independently of the screens. Fig. 6 is a view similar to Fig. 5, illustrating a modified form of the complete indicator comprising an arrangement of screens such as that shown in Fig. 4; the index-needles being supported independently of the screens. Fig. 7 is a face view showing two adjustable gridiron-screens superposed one upon the other to form an adjustable reticulated screen. Fig. 8 is a detailed face view of part of an adjustable gridiron-screen, showing one method of maintaining the tension of the threads. Fig. 9 is a detailed face view of another form of adjustable gridiron-screen (with the middle portion broken away), showing another method of maintaining the tension of the threads. Fig. 10 is a perspective elementary view illustrating the mode of combining an adjustable reticulated screen (constructed substantially as indicated in Fig. 9) with an adjustable gridiron-screen (formed substantially as indicated in Fig. 7) so as to constitute an arrangement of screens substantially similar to that shown in Fig. 4, both screens being however adjustable. Fig. 11 is a perspective detail view of part of a gridiron-screen wherein bars are employed in place of threads. Fig. 12 is a perspective elementary view illustrating the combination, with an adjustable gridiron-screen and an adjustable reticulated screen, of index-needles so connected to the respective screens as to be self-adjusting in accordance with the adjustments of the respective screens.

Similar reference symbols denote corresponding parts throughout the drawings.

For the purpose of the invention the solid is conceived of as divided into three mutually-interpenetrating series of lamellæ (i. e. thin strata or slices) of uniform unit-thickness, successive lamellæ of each series being separated from one another by equidistant imaginary planes parallel to one of the zero-planes, so that, in effect, the solid is conceived of as built up of juxtaposed unit-cubes of uniform unit-dimensions, the opposite faces of each cube being constituted by corresponding portions of a pair of adjacent lamellar surface-planes. Hence, assuming the successive lamellæ of a series to be designated by consecutive numerals which count from the zero-plane to which said lamellæ are parallel, it follows, first, that the position of any unit-cube within the solid will be definable by the combination of the three numerals denoting its lamellar distances (which are, in fact, coordinates) from the respective zero-planes of the solid; and that, secondly, the position of any predetermined point in the solid will be definable as being situated within that unit-cube which contains it, the assumption being that a unit-cube is so small as to render negligible any variation of position of the point within it.

The stereotaxic indicator is designed to furnish such a representation of the assumed lamellar structure of the solid as will permit free movement of the finder within the space corresponding, in the indicator, to that actually occupied by the solid, for which purpose the respective indicator-planes of the indicator are formed by three gridiron-screens or gratings each presenting a series of threads, bars, or equivalent elements extending in one plane and parallel to one another at distances apart corresponding to the thickness of the individual lamellæ of the corresponding series in the solid; each screen constituting in effect a uni-directional scale, with reference to a zero-line in which the position of the index-point along this scale may be readily determined. In one arrangement of screens, illustrated in Fig. 1, wherein all the screens are mutually perpendicular, the planes of the three screens actually or virtually intersect or contact with one another along the three edges of a solid right angle, and these edges, corresponding to the lines of intersection of the respective zero-planes of the solid, will constitute the zero-lines of those screens whose threads are respectively parallel to the several edges. That is to say, the screen A (Fig. 1), which is to be understood as being square and extending in a horizontal plane, meets the two square vertical screens B and C (whose dimensions are equal to those of A) at the horizontal lines $y$ and $x$ respectively, while the screens B and C meet one another at the vertical line $z$. The line $x$, whereat the screens A and C meet one another, is the zero-line of the screen A, whose threads $a$ are parallel to $x$; the line $y$, whereat the screens A and B meet one another, is the zero-line of the screen B, whose threads $b$ are parallel to $y$; and the line $z$, whereat the screens B and C meet one another, is the zero-line of the screen C, whose threads $c$ are parallel to $z$. In an arrangement such as illustrated in Fig. 1, the index-point, mechanically adjustable in three directions parallel to the planes of the respective screens A, B, and C, may be readily set with concurrent reference to the three uni-directional scales constituted by the respective screens, with the aid of as many mechanical ordinates each adapted to contact perpendicularly with one of the screens; each scale being read from its own zero-line transversely of the threads which mark the divisions of the particular scale. The mechanical ordinates employed may have the form of index-needles whose virtual axes intersect one another at right angles in the index-point itself, each needle being slidable in a plane perpendicular to that screen A, B or C whereon it is required to indicate by contact of the point of the needle with successive threads of the screen. Such an arrangement will be seen on reference to Fig. 5, which shows an example of a complete indicator wherein screens as in Fig. 1 are employed. In another arrangement of screens illustrated in Fig. 2, two of the screens are superposed so that the threads of the one overlie those of the other so closely that both screens of the pair virtually occupy the same plane, the threads of the respective screens of the pair extending at right angles to one another so that these two combined screens constitute in effect a single reticulated screen or grating serving as a duo-directional scale. That is to say, on referring to Fig. 2 it will be seen from the dotted lines that the horizontal screen A of Fig. 1 has now been rotated, about the zero-line $y$ whereat it formerly met the screen B, through a right angle until the two gridiron-screens A and B have virtually coalesced to form the vertical reticulated screen AB wherein the threads $a$ cross the threads $b$ perpendicularly. The originally horizontal zero-line $x$ of the screen A (Fig. 1), therefore, has also now coalesced with the vertical zero-line $z$ of the screen C to form the vertical zero-line $xz$ (Fig. 2), adapted to serve as the zero-line in reading not only the uni-directional scale constituted by the screen C, but also the duo-directional scale constituted by the combined uni-directional screens A and B, when this duo-directional scale is employed for the determination of distances measured transversely of its vertical threads $a$. The zero-line $y$ will obviously continue to serve for use in reading the duo-directional scale AB when this is employed for determining distances measured transversely of its horizontal threads $b$. In an arrangement such as illustrated in Fig. 2, the index-point may be set by the aid of only two index-needles, whereof the one is movable, along with the index-point, over the reticulated screen AB in two directions at right angles to one another and to the slidable axis of the needle itself, while the other index-needle is movable as before over the remaining single screen C; the value of the ultimate result (as regards the positioning of the index-point) being the same as that obtained with the arrangement described with reference to Fig. 1. Such an arrangement will be seen on reference to Fig. 6, which shows an example of a complete indicator wherein screens as in Fig. 2 may be employed.

If the stereotaxic indicator be intended for use in cases where, for example, the zero-planes of the solid do not intersect one another within the solid itself, the screens of the indicator may have the form of rectangular frames and be so assembled that each contacts with the respective remaining screens along two adjacent edges (actually or virtually); the space demarcated by the screens being in such case single, that is to say, undivided by the presence of any of the screens within it. Figs. 1 and 2 illustrate such an arrangement of screens, which is more especially suitable in cases where the solid is of non-symmetrical configuration. In cases, however, wherein the solid is approximately symmetrical with reference to one plane passing through it, or to two or more planes which intersect one another at right angles within the solid, it is more convenient to employ an arrangement wherein some or all of the screens actually intersect one another, the total space demarcated by the screens being in such case divided (according to circumstances) into two, four, or eight regions between which the screens serve as partitions. Thus for example in Fig. 3, three square and mutually perpendicular gridiron-screens A, B, and C, each similar to the corresponding screen in Fig. 1, are shown as intersecting one another at their respective center-lines, the total space demarcated being consequently divided into eight regions. In this case the three zero-lines $x$, $y$, and $z$ appertaining to the respective screens A, B and C intersect one another perpendicularly at the center of length of each, and the unidirectional scale constituted by each screen may be read from its zero-line toward either side thereof, according to the particular region wherein the part of the solid being dealt with is assumed to lie.

In cases where, a gridiron and a reticulated screen being employed, the screens actually intersect one another, such mutual intersection of the screens is most conveniently effected by the reticulated screen being inserted through the center of the gridiron-screen, of which latter a median thread is omitted to enable this to be done. An example of such an arrangement is shown in Fig. 4, wherein the horizontal gridiron-screen A of Fig. 3 may be assumed (as indicated by the dotted lines in Fig. 4) to have been rotated, about the zero-line $y$ whereat it formerly intersected the vertical gridiron-screen B, through a right angle until the two screens A and B have virtually coalesced to form the reticulated screen AB. In practice, the median thread of the vertical gridiron-screen C would most conveniently be omitted, and the self-contained reticulated screen AB would be passed through the opening thus afforded, until the median vertical thread of the screen AB had assumed the position of the omitted thread of the screen C. This median vertical thread of the reticulated screen will now constitute the vertical zero-line $xz$ which is adapted to serve a double function as already described with reference to Fig. 2, while the horizontal zero-line of the reticulated screen may be either retained at the center of the height of said screen as indicated in Fig. 4, or transferred thence to the upper or lower edge of the screen according to convenience. In the example illustrated in Fig. 6, the zero-line $y$ of the reticulated screen is understood to be at the lower edge of the screen.

Figs. 5 and 6 illustrate two forms of the stereotaxic indicator as a whole, wherein the arrangements of screens employed are respectively as already described with reference to Figs. 1 and 4. In Fig. 5, the index-point O is to be understood as coinciding with the point of virtual intersection of the three mutually-perpendicular index-needles X, Y, Z, which are perpendicular to one another and to the respective screens A, B and C and are, moreover, longitudinally adjustable each in a separate guide in a cross-head D slidable upon a graduated horizontal bar $d$ which extends, parallel to the plane of the screen C, from a graduated vertical bar $d^1$. The bar $d^1$ is vertically adjustable through a slide-block $D^1$ which in turn is adjustable lengthwise of a graduated horizontal guide $d^2$ extending parallel to the plane of the screen B. In such an arrangement, if the required position of the index-point O is known with reference to the three uni-directional scales constituted by the respective screens A, B and C, the three index-needles X, Y and Z, which are adapted to register upon the respective screens, can be set so that their extremities contact with those threads of the several screens which correspond with the known position. This operation of setting the index-needles will involve the horizontal adjustment of the cross-head D along the bar $d$, the vertical adjustment of the bar $d^1$ through the slide-block $D^1$, and the horizontal adjustment of the slide-block $D^1$ along the guide $d^2$. Means are provided whereby, when these adjustments have been effected, the cross-head D, bar $d^1$, and the slide-block $D^1$ can be clamped securely in their respective positions; and it will be obvious that the index-point O may at any subsequent time be accurately replaced in the same position (relatively to planes which occupy, or are assumed to occupy, the positions of the screens A, B and C) by resetting the cross-head D, bar $d^1$, and slide-block $D^1$ in the positions denoted by the graduations inscribed on the bars $d$ and $d^1$, and the guide $d^2$ respectively. It is generally more convenient to represent the index-point O by a small star formed, as shown in Fig. 6, by short wires fixed to and crossing one another so that their junction clearly denotes the actual point required, this star O being mounted a convenient distance above the cross-head D which serves to carry both it and also the index-needles. In Fig. 6, owing to the fact that the reticulated vertical screen AB replaces the horizontal and vertical screens A and B of Fig. 5, only two horizontal and mutually perpendicular index-needles are required. Of these, the needle Z is perpendicular to and adapted to register upon the gridiron-screen C as before, while the needle XY is perpendicular to and adapted to register upon the reticulated screen AB. In consequence of the star O being raised above the level of the cross-head D and therefore above the level of both needles Z and XY, it is necessary that the registering end of the needle XY (which is used for indicating measurements in two directions at right angles to one another) should be upwardly bent so that its extremity shall contact with the screen AB at a point on the same level as the center of the star. As the needle Z, however, serves only for indicating measurements in the horizontal direction (i. e. transversely of the vertical threads $c$ of the screen C), the level at which its extremity contacts with the screen C is of no importance. The method of adjusting the position of the index-point or star O is substantially the same in the case of Fig. 6 as has already been described with reference to Fig. 5.

In the form of the stereotaxic indicator illustrated in Figs. 5 and 6, there is erected, about the screens and the space which they demarcate, an open frame E of approximately (and so-called) cubical form, whose virtual bounding-planes are parallel to the actual or virtual positions of the respective screens. That is to say, in Fig. 5, wherein three gridiron-screens A, B and C are employed, the upper bounding plane of the cubical frame E is parallel to the horizontal screen A, what may be called the front and rear bounding planes of the frame are parallel to the vertical screen B, and the lateral bounding planes of the frame are parallel to the vertical screen C. In Fig. 6, wherein a vertical gridiron-screen C and a vertical reticulated screen AB are employed, the front and rear bounding planes of the cubical frame E are parallel to the screen AB, the lateral bounding planes of the frame are parallel to the screen C, and the upper bounding plane of the frame is horizontal, or in other words perpendicular to both screens. The cubical frame E serves as the support for a detachable rectangular stage F which, while shown as a flat frame closely applied to the top of the cubical frame E, is to be understood as being capable of being fixed upon each side of the frame E in turn according to requirements. The stage F constitutes the stationary base of a compound slide-rest comprising a lower member $F^1$ and an upper member $F^2$ conjointly affording means for the rectilinear adjustment of the finder in two directions at right angles to one another in a plane parallel to that virtual bounding-plane of the cubical frame E which is represented by the particular side of said frame to which the stage F is for the time being fixed. The pointed straight rod G which constitutes the finder is mounted upon the upper member $F^2$ of the compound slide-rest through the medium of a support H (which may be termed the "pillar") rotatable about an axis perpendicular to the plane in which the members $F^1$, $F^2$ of the slide-rest are movable; the finder G being adjustable lengthwise of its own axis in a socket $G^1$ pivoted to swing about an axis $g$ parallel to said plane, and at any predetermined or adjustable distance therefrom, so that the finder G has provision for a compound angular adjustment relatively to the slide-rest, in addition to its capability of movement lengthwise of its own axis. In the examples illustrated in Figs. 5 and 6, the axis $g$ is carried by a slide-block $h$ which is adjustable lengthwise of the pillar H so as to enable the distance of the axis $g$ from that bounding-plane of the cubical frame E to which the stage F is applied to be varied according to requirements. The angular adjustment of the finder-socket $G^1$ about the axis $g$ is effected by means of a graduated quadrant $q^1$ carried by the slide-block $h$. It will now be seen that if (after the stage F has been fixed to one side of the cubical frame E) the appropriate rectilinear adjustments be effected in the case of the respective members $F^1$, $F^2$ of the slide rest (and also in the case of the slide-block $h$ if necessary), and the appropriate angular adjustments be also effected in the case of the finder-socket $G^1$, so that the axis of the finder G points (at any desired inclination to one or more of the screens) directly toward the index-point O, the finder G may thereupon, by a single movement lengthwise of its own axis, be projected through its socket $G^1$ until the extremity of the finder is brought into contact with the index-point. When this has been done, the positions occupied by the members $F^1$, $F^2$ of the compound slide-rest with reference to the stage F (or in other words with reference to the cubical frame E and therefore the screens) and to one another, as well as the angular or other adjustments of the pillar H, slide-block $h$, and finder-socket $G^1$, and the projection of the finder G itself relatively to its socket $G^1$, are all ascertained by means of scales carried by the various parts, so that the several adjustments necessary for bringing the point of the finder G into contact with the index-point O can be recorded, and reproduced at will. It will be obvious that any one or more of the adjustments may be constant and fixed, if this be found convenient.

The stereotaxic indicator is intended for use in conjunction with, and serves as a means of translating, maps or charts of the individual lamellæ whereof the solid is regarded as being composed. Such charts (assuming them to be intended for practical use as guide-maps applicable to a considerable range of solids whose contents are generically similar) must obviously exhibit standard forms of the solid represented, but to these standardized charts the actual solids treated by means of the operative instrument may or may not in all respects conform. For example, in dealing with natural objects, while it is possible to provide standardized charts, or charts prepared from sections of specimens of similar objects sufficiently typical to serve as standards for the purpose in hand, the actual object to be treated by means of the operative instrument may differ from the standard object (represented in the charts) as regards the ratio between any two diameters or similar leading dimensions. Now, the existence of such a difference of diameter implies a difference of scale between the lamellar thicknesses in the standard and in the actual objects respectively, the number of lamellæ in any one of the three sets remaining constant whatever the scale of the object. Hence, in order that the star which would as a rule be employed to denote the index-point O in the stereotaxic indicator may be so set as to accurately represent the position of the predetermined point within the object (or so-called solid) actually under treatment, the ordinates determining the position of the star with reference to the respective screens must directly agree, as regards their relative scales, not with the standard scales of the charts, but with scales corresponding to the actual dimensions found existing in the object itself. To permit of this, it is necessary that the unit-distance between the threads of each screen should be variable at will so as to be capable of adjustment to correspond with the actual thickness of the lamellæ of that set represented by the screen; the adjustments in the case of the several screens being independent of one another, so that the distances apart of the threads in the respective screens may be made to bear the same ratio to one another as do the thicknesses of the assumed lamellæ of the respective sets composing the object actually under treatment. For this purpose a convenient construction in the case of each adjustable screen is shown in Fig. 7 as applied to each member of a superposed pair of identically similar gridiron-screens A and B together constituting an adjustable reticulated screen. Describing the construction with particular reference to the gridiron-screen A, it will be seen that the threads $a$ of the screen are attached at their opposite ends to a pair of sway-bars $J^1$, $J^2$ respectively pivoted to swing, in the plane of the screen, about fulcrums $j^1$, $j^2$ lying in one straight line which is parallel to the threads $a$ and is preferably coincident with the line $j$ denoted by a median thread of the series, the corresponding ends of the respective sway-bars being coupled together by a pair of links J of equal length pivoted to the bars $J^1$, $J^2$ so that the bars and links together form a parallelogrammatic frame capable of being made to assume either a rectangular or a more or less oblique form at will. The threads $a$ are all of equal effective length, their points of attachment to either sway-bar extending in a straight line which is constantly parallel to the line of their points of attachment to the other sway-bar, and these lines of attachment being perpendicular to the median line $j$ of the screen (wherein the sway-bar fulcrums lie) when the sway-bars $J^1$, $J^2$ themselves are likewise virtually perpendicular to the same median line. It will be seen that when the sway-bars are thus perpendicular to said median line, the threads $a$ of the screen will be at their greatest distance apart, and that by distorting the parallelogrammatic frame from the rectangular to a more or less oblique form (as shown in Fig. 7), the threads may be made to approach one another to any desired extent within practicable limits, without affecting their parallelism with reference to one another and to the median line $j$. The distance apart of the threads $a$ when the sway-bars $J^1$, $J^2$ have some intermediate degree of inclination to the median line $j$ of the screen may be regarded as the normal distance corresponding to the standard lamellar thickness represented in the charts, so that the screen may be set to read in accordance with the measurements of actual objects whose scale of dimensions (in the direction corresponding to that denoted by the particular screen) is either greater or less than that exhibited by the charts. The setting of each screen may be effected with the aid of a quadrant-scale $J^3$ attached to one of the sway-bars ($J^1$ in the example illustrated) and a stationary clamping-screw $j^3$, the reading of the scale $J^3$ enabling any particular inclination of the sway-bars $J^1$, $J^2$ and consequent distancing of the threads $a$ to be reproduced at will.

Fig. 10 shows in perspective, in an elementary form, the combination with a pair of adjustable gridiron-screens A and B superposed to form an adjustable reticulated screen as in Fig. 7, of an adjustable gridiron-screen C, the combination providing an arrangement similar to that shown in Fig. 4 but with the addition of adjustability, so that further description is unnecessary. The fulcrums $j^1$, $j^2$ of the several screens may be supported in any convenient manner.

In order to facilitate the employment of the screens as scales, it is advisable to provide means for enabling any thread of a screen to be readily identified. For this purpose the threads of each screen may be numbered consecutively from that thread which represents the zero-line of the particular screen, by means of numerals inscribed on the sway-bars or equivalent members of the frame of the screen. The threads themselves may be distinctively colored; thus for example, if the general coloring of the threads be white, each fifth thread might be colored blue, and each tenth thread scarlet for the sake of more ready distinction.

If threads, thin wires, or similar flexible elements be used in a screen, their ends may be secured by being passed through holes or by being made fast to wrist-pins $k$ on the sway-bars, as indicated in Fig. 8 with reference to the screen B. Or, as indicated in Fig. 9 with reference to the screen B, a single continuous thread $b$ may be used, this thread passing in zig-zag fashion from end to end of the screen and being at each turn lapped about a pulley $k^1$ carried by the corresponding sway-bar $J^1$ or $J^2$; the series of pulleys $k^1$, which form a row on each sway-bar, being of equal effective diameter and centered at distances apart equal to twice their effective diameter. By pulling on one of its ends the whole thread may be tightened. More especially in cases where, as in Fig. 8, the threads are made fast to wrist-pins $k$ (or holes), it is obviously necessary that the threads should be maintained under a tension sufficient to prevent sagging. For this purpose one end of all the threads may be attached to the corresponding sway-bar not directly but through the medium of an adjustable stretcher K (Fig. 8) constituted by a separate bar to which the ends of the threads are immediately fastened. This stretcher K is secured to the sway-bar by means of screws L attached to the stretcher and passing through holes in abutments $L^1$ on the sway-bar, the screws having nuts $l$ whereby the position of the stretcher K relatively to the sway-bar may be adjusted at will in the direction of the threads. In order to avoid risk of overstraining the threads, springs $l^1$ may be interposed between the abutments $K^2$ on the sway-bar and the nuts $l$.

In cases where it is preferred to employ elements more rigid than threads or the like, the threads may be replaced by thin bars or blades set edgewise; the attachments of these bars or blades to each sway-bar, if the screen be adjustable, being in the form of pintles or the like rotatable about axes parallel to the fulcrum-axes of the sway-bars themselves so as to permit of the parallelogrammatic distortion of the screen as above described. In Fig. 11, which is a perspective view showing in detail part of a screen constructed in this way, the threads are replaced by triangular or knife-edge bars M, whose ends are attached to the respective sway-bars $J^1$ and $J^2$ through the medium of pintles or studs $M^1$ and $M^2$ (into cross-notches in whose heads the triangular bars are dove-tailed), each pintle being mounted to turn upon the corresponding sway-bar about an axis perpendicular to the general plane of the screen. Assuming one end of each bar M to be fixed to the corresponding pintle $M^1$ by means of a cross-pin as indicated at $m^1$, the opposite end would be left free to slide through the cross-notch in its pintle $M^2$, so as to permit compensation for any irregularity in the effective lengths of the several bars M of a series. Where such relatively rigid bars are employed, the index-needles may be clamped to and carried by the bars, while the star denoting the index-point may be supported by the intersection of the index-needles clamped to the bars. Assuming the screens to be adjustable, then, more particularly in cases where two such screens are superposed to form in effect a single reticulated screen, a construction embodying the feature just mentioned may be utilized so as to render the index-point, after having been initially set with reference to the charts (which as already stated represent standard lamellar thicknesses), self-adjusting when the screens are subsequently distorted so as to bring the distance between the bars of each screen into accordance with the actual thicknesses of the assumed lamellæ in the object to be dealt with. An example of such an arrangement is illustrated in Fig. 12, wherein each gridiron-screen A, B and C extends in a vertical plane and consists of a parallelogrammatic frame comprising upper and lower parallel sway-bars $J^1$, $J^2$ hinged at $j^1$, $j^2$ to a vertical post N placed at the line of virtual intersection of the screens, the outer ends of the sway-bars being coupled together by vertical links J, so that each screen may be independently distorted in its own plane for the purpose of adjusting the distance between its bars $a$, $b$ or $c$. The screens A and B are superposed to form an adjustable reticulated screen AB, while the bars $c$ of the gridiron-screen C extend vertically. The index-needles Z and XY respectively appertaining to the screens C and AB are carried by and project from travelers $p^1$ and $p^2$ fitted to slide lengthwise of horizontal arms $P^1$ and $P^2$, which extend transversely of the screens AB and C respectively and in close proximity to the surfaces of the screens, the arm $P^1$ being adjustable vertically over the screen AB and the arm $P^2$ adjustable (as one with the arm $P^1$) vertically over the screen C. The index-needles Z and XY cross one another at right angles in a slide R which engages both needles and serves to carry the star O denoting the index-point. At the level of this star, the traveler $p^1$ engages the reticulated screen AB at the crossing-point of any vertical bar $a$ with any horizontal bar $b$ of the screen, the traveler being (as indicated) provided for this purpose with four outwardly-projecting pins adapted to enter those four rectangular spaces of the screen which are separated by the intersection of the two bars which cross one another at the level of the star. The traveler $p^2$ engages any vertical bar $c$ of the screen C, the traveler being (as indicated) provided for this purpose with two outwardly-projecting pins adapted to engage opposite sides of a bar. In order to enable the travelers $p^1$, $p^2$ to be initially moved over the surface of their respective screens so as conjointly to effect the bringing of the star O to the required position, it is necessary that each traveler, and therefore also each arm $P^1$ and $P^2$, should be capable of being withdrawn from contact with its screen. For this purpose the arms $P^1$ and $P^2$ are respectively carried by tubular sockets $q^1$ and $q^2$ fitted to turn independently about an externally-cylindrical sleeve Q which is splined upon the vertical post N; the two sockets $q^1$ and $q^2$ being mounted one above the other between collars $q$ on the sleeve so as to be constrained to move as one with the latter, while the arms $P^1$ and $P^2$ are normally retained in operative proximity to their respective screens by means of springs $s$ coiled about the sleeve Q and bearing against lugs on the sockets $q^1$ and $q^2$, as indicated.

The terms threads or threadlike members used in the claims are intended to cover any suitable filament or device that may be used to represent the lines of intersection of the respective sets of planes or planes of reference referred to.

It will be obvious that if the travelers $p^1$ and $p^2$ be initially set so that the star O occupies the required position relatively to the respective screens, any subsequent parallelogrammatic distortion of either of the gridiron-screens A and B (which together form the reticulated screen AB), or of the screen C, will transmit to the cross-slide R a movement corresponding in extent to the change effected in the distance between the bars of the screen thus distorted, the sleeve Q when necessary sliding vertically on the post S, so that the star O will automatically retain its predetermined position relatively to all the screens while participating in any adjustment of the distance separating the bars of each screen.

Claims:

1. In an apparatus for the purpose described the combination with a frame or support of three sets of equally spaced threads representing the lines of intersection of three sets of planes at right angles to each other, each thread representing the line of intersection of two planes and means adapted to coöperate concurrently with the three sets of threads for locating any desired point within said frame or support.

2. In an apparatus for the purpose described the combination with a frame or support or gratings comprising three sets of equally spaced threads representing the lines of intersection of three sets of planes at right angles to each other, each thread representing the line of intersection of two planes and mechanical means adapted to coöperate concurrently with the three sets of threads for locating any desired point within said frame or support.

3. In an apparatus for the purpose described the combination with a frame or support of gratings comprising three sets of equally spaced threads representing the lines of intersection of three sets of planes at right angles to each other, each thread representing the line of intersection of two planes, mechanical means adapted to coöperate concurrently with the three sets of threads for locating any desired point within said frame or support and a finder adapted to be brought to the point so located.

4. In an apparatus for the purpose described the combination with a rectangular frame of gratings comprising three sets of equally spaced threads representing the lines of intersection of three sets of planes at right angles to each other, each thread representing the line of intersection of two planes, said frame having its opposite faces parallel respectively to the three sets of planes, means for adjustably supporting an index-point within said frame and index needles adapted to coöperate with the threads of the respective sets for locating said index-point at any desired point concurrently with respect to the three sets of planes.

5. In an apparatus for the purpose described the combination with a rectangular frame of gratings comprising three sets of equally spaced threads representing the lines of intersection of three sets of planes at right angles to each other, each thread representing the line of intersection of two planes, said frame having its opposite faces parallel respectively to the three sets of planes, means for adjustably supporting an index-point within said frame and a finder adapted to be projected into said frame and contact with said index-point.

6. In an apparatus for the purpose described the combination with a rectangular frame of gratings comprising three sets of equally spaced threads representing the lines of intersection of three sets of planes at right angles to each other, each thread representing the line of intersection of two planes, said frame having its opposite faces parallel respectively to the three sets of planes, means for adjustably supporting an index-point within said frame, a stage adapted to be fastened to one face of said frame, adjustable slide members carried thereby and a finder carried by one of said members and adapted to be projected into contact with said index-point.

7. In an apparatus for the purpose described the combination with a rectangular frame of gratings comprising three sets of equally spaced threads representing the lines of intersection of three sets of planes at right angles to each other, each thread representing the line of intersection of two planes, said frame having its opposite faces parallel respectively to the three sets of planes, means for adjustably supporting an index-point within said frame, a stage adapted to be fastened to one face of said frame, adjustable slide members carried thereby, a finder carried by one of said members and adapted to be projected into contact with said index-point and means permitting angular and longitudinal adjustment of said finder.

8. In an apparatus for the purpose described the combination with a rectangular frame of gratings comprising three sets of equally spaced threads representing the lines of intersection of three sets of planes at right angles to each other, each thread representing the line of intersection of two planes, said frame having its opposite faces parallel respectively to the three sets of planes, a base-board forming one side of said frame, an adjustable support mounted on said base-board and extending into said frame, an index-point carrier adjustably mounted upon said support and index needles adjustably mounted in said carrier and adapted to coöperate with the threads of said gratings for locating the index-point at any desired position with respect to the three sets of planes.

9. In an apparatus for the purpose described the combination with a rectangular frame of gratings comprising three sets of equally spaced threads representing the lines of intersection of three sets of planes at right angles to each other, each thread representing the line of intersection of two planes, said frame having its opposite faces parallel respectively to the three sets of planes, a base-board forming one side of said frame, an adjustable support mounted on said base-board and extending into said frame, an index-point carrier adjustably mounted upon said support, index needles adjustably mounted in said carrier and adapted to coöperate with the threads of said gratings for locating the index-point at any desired position with respect to the three sets of planes and a finder adjustably mounted on one face of said frame and adapted to be projected into contact with said index-point.

10. In an apparatus for the purpose described the combination of grating screens, representing three sets of planes intersecting each other at right angles, each comprising a frame adapted to support a plurality of equally spaced parallel thread-like members, and means for varying the equal spacing of said thread-like members.

11. In an apparatus for the purpose described the combination of grating screens, representing three sets of planes intersecting each other at right angles, each comprising a frame adapted to support a plurality of equally spaced parallel thread-like members, and means coöperating with said screens for locating any desired point relative to the three sets of planes.

12. In an apparatus for the purpose described the combination of grating screens, representing three sets of planes intersecting each other at right angles, each comprising a frame adapted to support a plurality of equally spaced parallel thread-like members, one of said screens being adapted to be superposed on another so that the thread-like members of one screen are at right angles to those of the other, an index-point, and means coöperating with the thread-like members of said screens for locating said index-point at any desired point concurrently with respect to the three sets of planes.

13. In an apparatus for the purpose described the combination of grating screens, representing three sets of planes intersecting each other at right angles, each comprising a frame adapted to support a plurality of equally spaced parallel thread-like members, one of said screens being adapted to be superposed on another so that the thread-like members of one screen are at right angles to those of the other, an index-point, and means permitting a variation of the equal spacing of the thread-like members of said screens.

ROBERT HENRY CLARKE.

Witnesses:
GEORGE ERNEST MINTERN,
WILLIAM GEORGE ELLIS JAVIES.

Copies of this patent may be obtained for five cents each, by addressing the "Commissioner of Patents, Washington, D. C."